Feb. 21, 1928.

W. ADELMANN

SIFTER

Filed Nov. 1, 1926

1,659,557

INVENTOR
William Adelmann
BY
William S. Gluck
ATTORNEY

Patented Feb. 21, 1928.

1,659,557

UNITED STATES PATENT OFFICE.

WILLIAM ADELMANN, OF NEW YORK, N. Y.

SIFTER.

Application filed November 1, 1926. Serial No. 145,559.

My present invention relates generally to sifters, and has particular reference to a type of sifter whose features render it particularly applicable for use by bakers in the sifting of flour.

It may be pointed out that the sifting of flour is essential for various reasons. In the commercial use of flour, the latter is received in bags and is generally stored in stacked condition in cellars or the like. The stacking of the bags subjects the flour to tremendous pressure, and as a result the flour soon becomes caked and lumpy. It is useless for baking purposes while it is in this condition. In the second place, cellars and other storage places of such a character are generally infested with rats, cats, and other objectionable creatures, and as a result it is readily understood that the flour accumulates all sorts of dirt, filth, and other impurities which must be separated therefrom before it can be properly utilized for baking purposes. In the third place, the sifting of flour is essential for the reason that the flour is thereby rendered lighter and becomes in a way saturated with air, thereby rendering it more porous and hence more efficient for the contemplated association with water.

In view of the human element which enters into the employment of flour, it is therefore essential, where sanitary conditions and high quality are of primary importance, that the sifting process be rendered as simple and expedient as possible. In other words, unnecessary labor must be eliminated because workmen frequently become calloused and lazy and are very apt to forego numerous steps of procedure if labor can be saved thereby.

One object of the present invention is to provide a device which renders the sifting of flour extremely simple and feasible under all conditions, thereby assuring the ultimate employment of finely sifted flour, and reducing to a minimum the possibility of having workmen forego the steps of sifting.

Another object of the invention is to provide a sifting device which will result in producing a more finely sifted flour per quantity of time than has been possible heretofore. For example, where it has been customary to employ sifters having a mesh of three-sixteenths of an inch, my invention renders it possible to produce the same quantity of sifted flour in the same unit of time with the employment of a mesh of one-sixteenth of an inch or less. One feature of my invention lies in providing a sifting device which is motor-driven, this factor being one which effects the numerous advantages referred to.

Another object of the invention is to provide a device which may be fed even while it is being used, in this way simplifying and speeding up the sifting process. A feature of my invention lies in providing the sifting device in the form of an inclined cylinder, the combination of inclined cylinder and motor-drive cooperating to produce the various advantages referred to.

Before proceeding to describe my invention in detail, I will premise that the sifted flour is generally employed and made use of in troughs. It is therefore one object of the invention to provide a sifting device which may be so associated with a trough that the sifted flour will be immediately available for use.

Where troughs are employed, it is of course desirable to employ the capacity thereof to its fullest extent. Certain features of my invention therefore lie in providing a device which is removably applicable to a trough so that the device will not interefere with the subsequent access to the trough; and a particular feature of the invention lies in providing means for associating the sifter in this removable manner with only one wall of the trough, thereby rendering it applicable at will to various portions of the trough regardless of the size of the latter.

Another feature of the invention lies in providing the device in a compact form which embodies in a unitary structure the motor, the attaching portion, and the sifter proper. A structure of this character renders the entire device light and easy to manipulate, thereby making the employment of the device and its transportation from place to place extremely simple and hence unobjectionable to workmen.

In accordance with the contemplated sanitary efficiency of the device, it is another feature to construct it in such a manner as to assure the purity of the sifted flour even where the unsifted flour is fed to the device during its operation. More particularly I will point out that in the employment of troughs, partitions are frequently made use of to subdivide the troughs into separated chambers. These partitions are variably positionable, and the structural nature of the present device is such that it may be employed in combination with a properly positioned partition for the positive prevention of undesired intermingling of sifted and unsifted flour.

An important feature of my invention lies in rendering the sifter proper removable with great ease from the unitary structure. In this way, the process of sifting is simplified still further and rendered even more efficient, because the entire unit need not necessarily be manipulated in order to clean the sifter proper. Furthermore, the removability of the sifter makes it possible to interchange sifters of various meshes; or, where a plurality of devices are employed, one sifter may advantageously be interchangeably associated with desired units. In this way, the advantageous features of speedy and efficient motor-driven sifting are still retained, while reducing still further the objectionableness of handling and transporting devices which have heretofore been cumbersome and heavy.

One feature of the invention lies in rendering the sifter removable in a manner which necessitates no adjustments of parts or manipulations of screws and the like, but merely by a direct application or withdrawal. In a preferred embodiment, the sifter is provided with a non-circular shank which is insertable into a suitably shaped opening in the drive means; and in this connection, the inclination of the sifter achieves the additional function of rendering this association with the drive means absolutely positive and secure in spite of the absence of set screws and the like.

Although I have described my device as having particular applicability to the sifting of flour, nevertheless as to certain phases of my invention, its employment for such uses as sand molding will be obviously advantageous. For example, in the sifting of sand prior to forming molds, troughs are frequently employed, and the applicability of my invention to a use of this character will be obvious. Furthermore, in the employment of molding machines, it is customary to sift the sand into various piles adjacent to the various machines. Consequently, my invention contemplates the employment with a bank of machines of a bank of sifter units adjacently positioned, the sifting of the sand being thereby accomplished in an extremely simple and prompt manner. In this connection, it will further be obvious that the removability and interchangeability of the sifters will render this application of the invention particularly efficient because of the ease with which sand can be sifted through desired meshes at desired points.

It is a general object of the invention to provide a device which is entirely devoid of cumbersome supporting parts, such as cabinets, casings, and the like, and to construct the unit of a minimum number of parts, these parts being extremely simple in their structure and cooperative relationships so as to render the entire device extremely efficient from the standpoint of lightness, cleanliness, and manufacture.

In view of the contemplated support upon only one wall of a trough, where the device is used with a trough, it is a further feature of the invention to provide the structure in an efficiently balanced manner, thereby rendering the strain upon the supporting wall extremely slight. In a preferred embodiment, a saddle portion is engageable over the wall and is so constructed as to permit association with its inner side of the sifter and to permit arrangement of a suitable counterweight, which may comprise the motor itself, upon its outer side. Transmitting means of a simple nature are suitably supported by the saddle and extend between the motor and the sifter proper.

For the attainment of the foregoing objects and such other objects as may hereinafter appear or be pointed out, I have illustrated one embodiment of my invention in the accompanying drawings in which—

Figure 1:
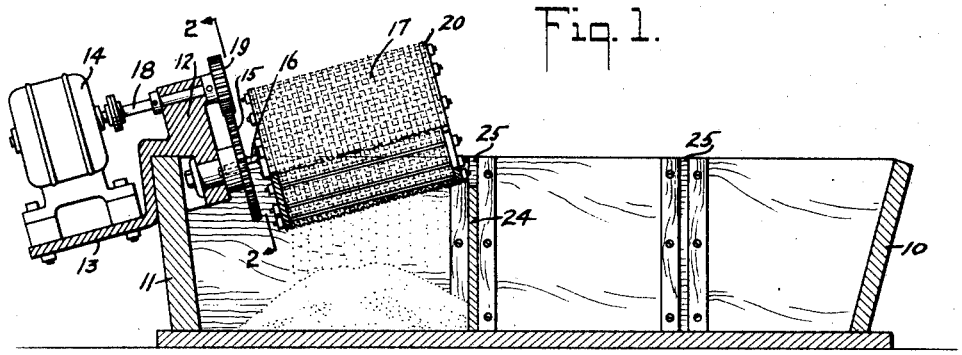
Fig. 1 is a side view of the device associated with a trough, certain portions being shown in cross-section and other portions being broken away for the sake of clearness.
Figure 2:
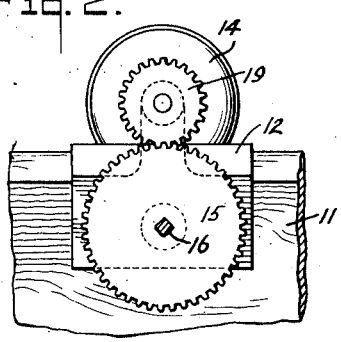
Fig. 2 is a fragmentary view, on an enlarged scale, taken along the line 2—2 of Fig. 1.

Referring to the drawings and particularly to Fig. 1, it will be observed that I have shown a trough 10 having a wall 11 with which the device is associated. The device comprises a saddle portion 12 suitably constructed to be engageable over the wall 11. Its outer portion is configured to provide a platform 13 upon which a motor 14 may be mounted. The inner portion of the saddle 12 is configured to provide a bearing for a spur gear 15 whose center portion is provided with a bore of non-circular shape. In the embodiment shown, this bore is in the shape of a square, and is designed to receive therein a suitably configured shank 16 associated with the sifter proper 17.

The upper portion of the saddle 12 is arranged and constructed to provide a bearing for a shaft 18 directly connected with the motor 14 and carries at its inner end a spur gear 19 considerably smaller than and meshing with the gear 15.

Figure 3:
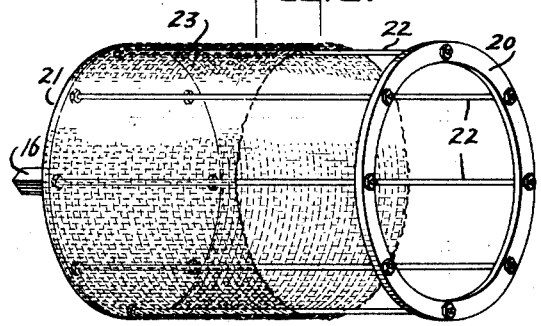
Fig. 3 is an enlarged perspective view partly broken away of the sifter proper, showing its general structural nature.

Referring for the moment to Fig. 3, it will be observed that the sifter may be very simply constructed by providing two end rings 20 and 21 and uniting them by spacing bars 22. The bars 22 will then in combination provide a supporting cage or framework upon which a suitable mesh 23 may be wound.

It will be observed that the rear ring 21 is in the form of a solid disc with which the shank 16 is associated. In this way, the disc 21 comprises a base for the general cylindrical structure, and the ring 20 bounds the opening in the opposite end thereof.

The device as a whole is so arranged and constructed as to position the cylindrical sifter in a manner which projects it inwardly from the supporting wall with the open end 20 furthermost from the wall. Reference to Fig. 1 will show how the unit is constructed and arranged to position the sifter at an incline upwardly from the wall, so that when material is fed into the opening 20 it will position itself within the sifter and will have no tendency to fall back out of the opening.

More particularly, it will be observed that the arrangement of parts is such that the gear 15 itself is at an incline, lying in a plane perpendicular to the axis of the contemplated position of the sifter. As a result, the sifter will be amply supported in position by the mere insertion of the shank 16 into the opening provided therefor in the gear 15. When it is desired to remove the sifter, it is simply withdrawn from the gear 15, and no manipulation of any set screws or other instrumentalities is necessary.

The inclination of the sifter itself has the advantage of permitting feeding thereof during its operation. It has an added advantage in permitting the positioning of a suitable partition 24 in close proximity to the lower portion of the open end 20 so that any material which may be carelessly aimed for the opening 20 will be prevented from falling into the already sifted flour. I have illustratively shown a plurality of grooves 25 in the trough into which the partition 24 is removably insertable, but it will be understood that the partition 24 may if desired be of a character to permit its positioning in desired places without the employment of any grooves 25.

Figure 4:
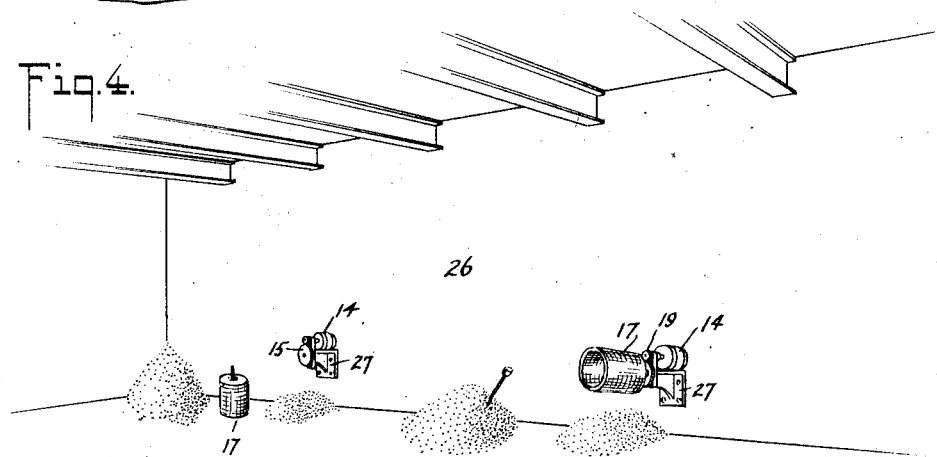
Fig. 4 is a diagrammatic representation of a possible employment of my device for sand molding purposes.

In Fig. 4 I have illustratively shown two units mounted upon a wall 26 in a manner which would be suitable for the adaptation of my invention for sand molding purposes. Although it will be understood that if desired a supporting wall may be provided similar to the wall 11 of Fig. 1, nevertheless I have shown a slight modification wherein the saddle portion 12 has been replaced by a bracket structure 27 fastenable to the wall 26. The bracket structure 27 will embody a supporting platform for the motor similar to the platform 13 of Fig. 1; it will embody a journal portion for the shaft 18, and in other respects the device will be substantially the same as the device illustrated in Fig. 1. The sifters 17 being removable, a set of sifters having various meshes may be interchangeably employed with desired units. The invention contemplates that each unit will be positioned in close proximity to a machine which will utilize the sand sifted by the unit, and it will thus be obvious that varying qualities of sifted sand may be provided at will in varying positions of the molding room.

It will be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. A sifting device comprising a frame, a motor mounted upon the frame, a screen unit carried by the frame and driven by the gears, said frame being provided with a recess properly contoured to slip removably over the edge of an upstanding wall and maintain said parts at an inclination to a horizontal.

2. A sifting device comprising a frame, a motor mounted upon the frame, a train of gears driven by the motor, a screen unit carried by the gears, said frame being provided with a recess properly contoured to slide removably over the edge of an upstanding wall and maintain said parts at an inclination to a horizontal.

In witness whereof, I have hereunto signed my name.

WILLIAM ADELMANN.